US007789289B2

(12) United States Patent
Bajahr et al.

(10) Patent No.: US 7,789,289 B2
(45) Date of Patent: Sep. 7, 2010

(54) HOLDING TOOL FOR FIXING AN ELECTRONIC COMPONENT AND CIRCULAR TABLE MANUFACTURING UNIT

(75) Inventors: Frank Bajahr, Bergisch Gladbach (DE); Ruprecht Wiskott, Wiehl-Bielstein (DE); Markus Spreng, Nümbrecht (DE)

(73) Assignee: Smartrac Technology Germany GmbH, Reichshof-Wehnrath (DE)

( * ) Notice: Subject to any disclaimer, the term of this patent is extended or adjusted under 35 U.S.C. 154(b) by 433 days.

(21) Appl. No.: 11/566,354

(22) Filed: Dec. 4, 2006

(65) Prior Publication Data

US 2007/0125830 A1 Jun. 7, 2007

(30) Foreign Application Priority Data

Dec. 5, 2005 (EP) .................................. 05111702

(51) Int. Cl.
*B23K 3/00* (2006.01)
*H01F 41/06* (2006.01)

(52) U.S. Cl. ..................... 228/180.5; 228/4.5; 228/904; 269/77; 269/82; 269/91; 269/86; 269/97; 269/203; 29/729; 29/739; 29/760

(58) Field of Classification Search .............. 228/180.5, 228/5.4, 904; 269/77, 82, 91, 86, 97, 203; 29/729, 739, 760
See application file for complete search history.

(56) References Cited

U.S. PATENT DOCUMENTS 5,572,410 A 11/1996 Gustafson
5,790,387 A * 8/1998 Gustafson .................. 361/807
6,067,235 A 5/2000 Finn et al.

FOREIGN PATENT DOCUMENTS

DE 43 07 080 A1 9/1994
EP 0 573 469 B1 7/1994
EP 1 471 544 A1 10/2004

OTHER PUBLICATIONS

European Search Report issued in corresponding application No. EP 05 11 1702, completed Apr. 4, 2006.

* cited by examiner

*Primary Examiner*—Jessica L Ward
*Assistant Examiner*—Erin B Saad
(74) *Attorney, Agent, or Firm*—Griffin & Szipl, P.C.

(57) ABSTRACT

A holding tool for fixing an electronic component (2) during a manufacturing process, the electronic component (2) comprising a winding assembly (20) and an electronic circuit (24), wherein the holding tool (1) includes a holding tool body (10), first and second jaws (12, 14) disposed at the holding tool body (10) relatively movable to each other in a first direction (A), and first and second wire guide means (3, 4) characterized in that the first and second wire guide means (3, 4) are disposed at the holding tool body (10) remote from the jaws (12, 14).

8 Claims, 3 Drawing Sheets

HOLDING TOOL FOR FIXING AN ELECTRONIC COMPONENT AND CIRCULAR TABLE MANUFACTURING UNIT

This application claims priority from European Patent Application No. 05111702.6 filed May 12, 2005, the entire disclosure of which is incorporated herein by reference.

FIELD OF THE INVENTION

The present invention is directed to a holding tool for fixing an electronic component during a manufacturing process, the electronic component, comprising a winding assembly and an electronic circuit, the holding tool comprising a holding tool body; first and second jaws disposed at the holding tool body relatively movable to each other in a first direction; and first and second wire guide means. The invention is further directed to a circular table manufacturing unit comprising a circular table to which at least one holding tool is mounted.

BACKGROUND OF THE INVENTION

Such a holding tool is known from EP 0 573 469 B1. In this known holding tool each jaw is provided with a wire guide pin about which a wire wound around a core of the winding assembly is guided in order to position a respective wire portion between the winding assembly and the respective wire guide pin over an associated contact portion of the electronic component so that the wire can be bonded or soldered to the contact portion.

It is very difficult with this known holding tool to place each wire exactly over the respective contact portion because the cores of different winding assemblies do not have exactly the same diameter. As the core is clamped in between both jaws the lateral distance between the jaws, in the closed position of the holding tool, depends on the diameter of the core. Thus, also the lateral distance between both wire guide pins is also depending on the diameter of the core of the actually manufactured winding assembly.

Furthermore, if the wire wound on the core is not exactly guided during the manufacturing process of the winding assembly, the outer diameter of a fabricated winding assembly may slightly differ from one winding assembly to another one.

As a consequence, the inclination angle of the respective wire with respect to a plane of symmetry of the jaws between the winding assembly and the associated guide pin differs from winding assembly to winding assembly so that the position of the wire over the contact portion of the electronic circuit is not always the same for each electronic component. Thus, misalignment of the wires may occur so that waste products are produced.

The known prior art embodiment is usually used together with a circular table manufacturing unit to which the known holding tool is mounted. During the manufacturing process of an electronic component with such a circular table manufacturing unit the wire guide pins mounted to the jaws according to the prior art cannot be adjusted at a position of the circular table manufacturing unit in which the precision of the position of the wires over the contact portions of the electronic circuit can be evaluated because at the position there is not enough space above the holding tool that could provide access to the guide pins. Thus, an adjustment of the wire guide pins can only be carried out in a subsequent position. In this subsequent position, however, the wires are already bonded or soldered to the respective contact portions and the wires are not longer guided around the wire guide pins. Therefore, it is difficult to adjust the wire guide pins and the result of such an adjustment can be evaluated only after a further sequence of manufacturing steps is carried out. Thus, the adjustment of the wire guide pins of a known holding tool mounted to a circular table manufacturing unit is an iterative process, which will lead to several waste products.

SUMMARY OF THE INVENTION

It is thus an object of the present application to define a holding tool for fixing an electronic component during a manufacturing process, the electronic component, comprising a winding assembly and an electronic circuit, which overcomes this disadvantage of the prior art and which allows one to reduce the production of defective work during the manufacturing of electronic components comprising a winding assembly and an electronic circuit.

It is another object of the present application to define a circular table manufacturing unit comprising such a holding tool.

The first object is achieved by a holding tool for fixing an electronic component during a manufacturing process, the electronic component, comprising a winding assembly and an electronic circuit, the holding tool comprising: (a) a holding tool body, (b) first and second jaws disposed at the holding tool body relatively movable to each other in a first direction, and (c) first and second wire guide means being disposed at the holding tool body remote from the jaws, wherein at least one of the first and second wire guide means is movably disposed at the holding tool body wherein at least the one of the first and second wire guide means can be moved in a plane parallel to the first direction.

The provision of the first and second wire guide means at the holding tool body remote from the jaws allows the positioning of the wire portions between the core of the winding assembly and the respective wire guide means in a reliable and reproducible manner exactly over the associated contact portion of the electronic circuit.

In a preferred embodiment, at least one of the first and second wire guide means is movably disposed at the holding tool body, wherein at least the one of the first and second wire guide means can be moved in a plane parallel to the first direction. This movability allows it to easily adapt the position of the associated wire portion dependent on a change in diameter of the core of the winding assembly.

Preferably the first and second wire guide means each comprise a wire guide pin mounted to a crank provided on a shaft rotatable about an axis which is remote from the axis of the wire guide pin. This preferred embodiment provides a wire guide means with which the position of the respective wire portion can be easily adjusted.

Preferably each crank of this holding tool is provided at an upper end of the respective shaft and positioned above an associated one of the jaws.

In case that each shaft of such a holding tool extends below a lower surface of the holding tool body, an adjustment of the respective wire guide means, and thus of the associated wire portion, can be easily carried out from below the holding tool body. For easily actuating the respective positioning mechanism for each wire guide means, each shaft is preferably provided with an actuator arm.

It is further preferred that the first and second movable wire guide means are provided with coupling means that can be coupled each to a drive means. This feature allows it that the wire guide means are coupled to an external drive mechanism so that no manual action for aligning the respective wire portion will be necessary.

In such an embodiment, it is preferred that a coupling means is provided at each one of the shafts.

The second object of the present invention is achieved by a circular table manufacturing unit comprising a circular table to which at least one holding tool according to the present invention is mounted.

Preferably, such a circular table is a multi-position circular table in which separate manufacturing steps are carried out at different positions. In this preferred embodiment, the drive means are provided at the circular table manufacturing unit on at least one position of the circular table wherein the drive means is adapted to be coupled to the coupling means of the first and second wire guide means. Preferably, the drive means is placed below the circular table, and thus below the lower surface of the holding tool, so that the space above the holding tool is not affected by the drive means for the first and second movable wire guide means.

It is also an object of the present invention to provide a method of manufacturing an electronic component comprising a winding assembly and an electronic circuit, which reduces the number of wrongly manufactured waste products.

This object is achieved by a method of manufacturing an electronic component comprising a winding assembly and an electronic circuit, the method comprising the steps of: providing the electronic circuit on a holding tool; feeding a core for the winding assembly to the holding tool and fixing the core in the holding tool; applying a wire on the core in order to produce the winding assembly; bonding the wire to contact portions on the electronic circuit; fixing the wire on the winding assembly and removing the electronic component from the holding tool; wherein the position of the wire over the contact portions of the electronic circuit is checked and, if necessary, adjusted so that the respective wire portion is exactly positioned over an associated contact portion before the wire is bonded to the contact portions.

The step of checking and, if necessary, adjusting the wire portions before the wire is bonded to the contact portions ensures that the respective wire portion is exactly bonded to the associated contact portion.

It is preferred that the adjustment of the wire is carried out by displacing guide means provided on the holding tool for guiding the respective wire portion extending away from the winding assembly.

BRIEF DESCRIPTION OF THE DRAWINGS

A best mode of carrying out the invention is now described with reference to the drawings in which.

DETAILED DESCRIPTION OF THE INVENTION

Figure 1:
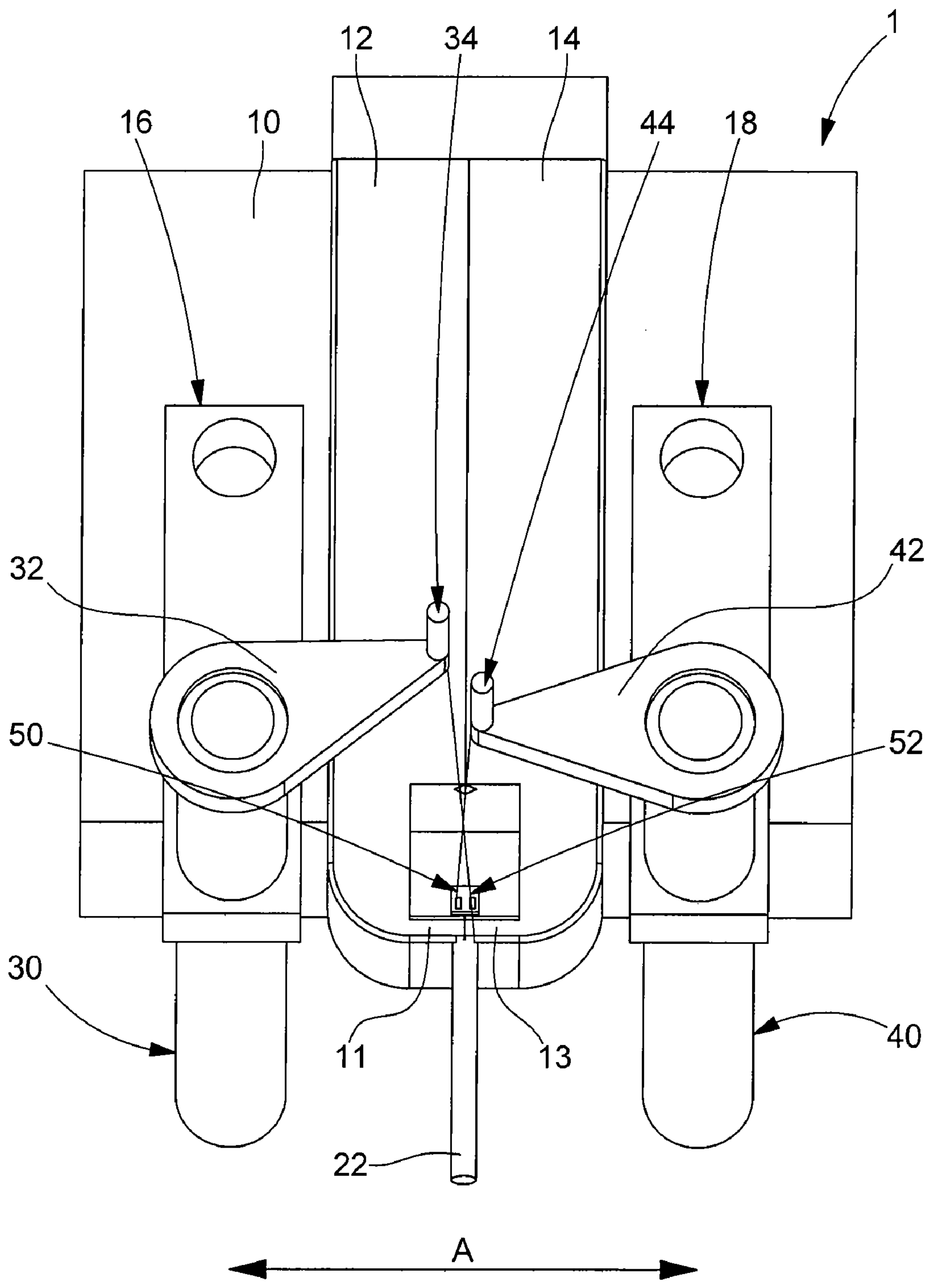
FIG. 1 is a perspective view of a holding tool according to the invention.

Certain terminology is used in the following description for convenience only and is not intended to be limiting. For example, words such as "upper" designate directions in the drawings to which reference is being made. Also in the drawings, where similar reference characters designate like parts throughout the several views, illustrated is a preferred embodiment of the present invention. It will be appreciated by those skilled in the art that the particular embodiment shown throughout the drawings is offered as an example that incorporates the teachings of the present invention and is merely exemplary.

The holding tool 1 shown in the drawings comprises a holding tool body 10, a first jaw 12 and a second jaw 14 disposed at the holding tool body 10 relatively movable to each other in a first direction "A" perpendicular to a plane of symmetry Z of the jaws 12, 14. The first and second jaws 12, 14 each are provided with a gripping portion 11, 13 at a tip end of each jaw 12, 14.

The gripping portions 11, 13 are adapted to clamp a core 22 of a winding assembly 20 of an electronic component 2 to be manufactured in the holding tool 1.

Figure 4:
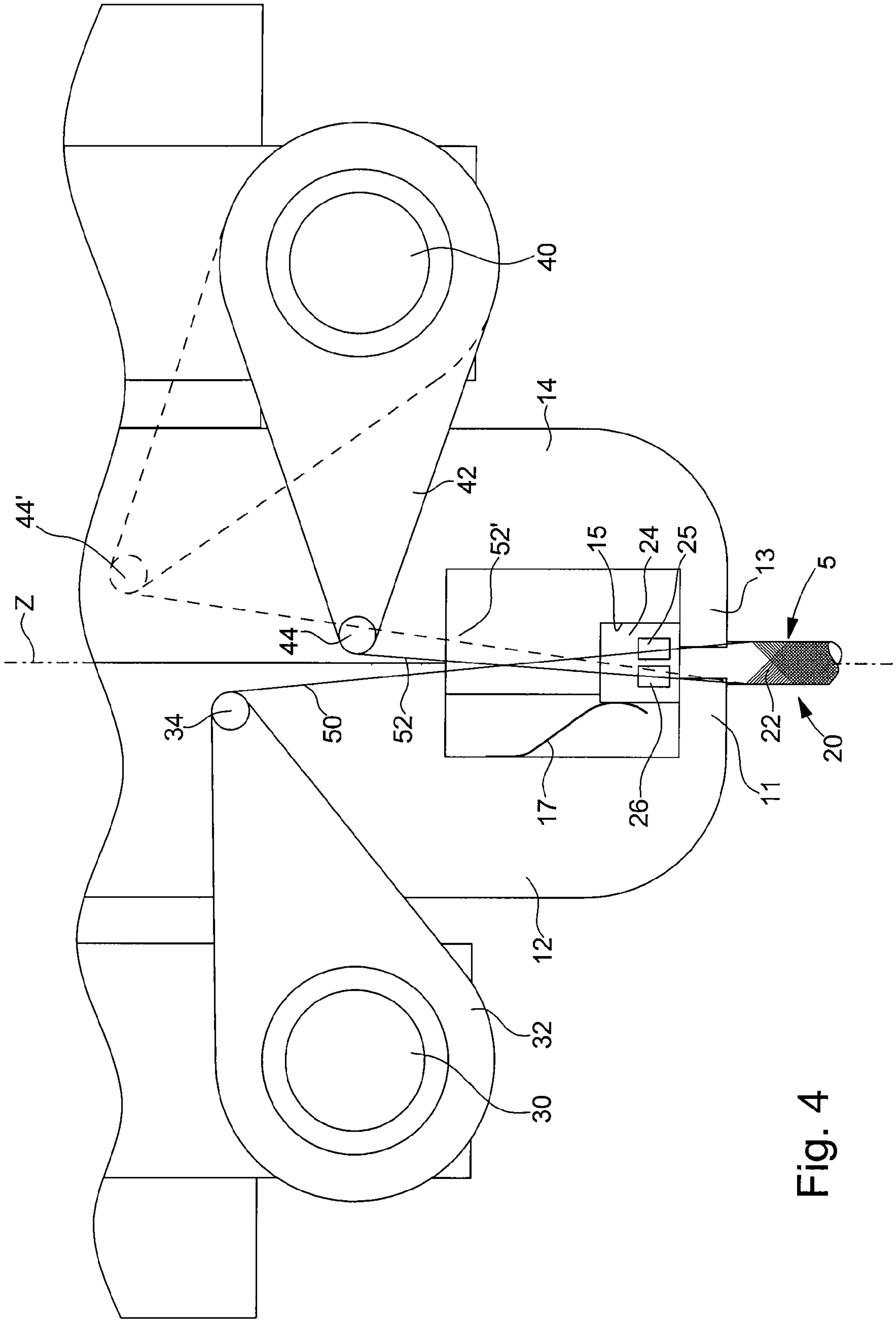
FIG. 4 an enlarged partial top view of the holding tool as shown in FIG. 2.

The gripping portion 11, 13 is also adapted to accommodate an electronic circuit 24 of the electronic component 2 in a recess 15 of the second jaw 14 as can be seen in FIG. 4. A spring 17 provided at the first jaw 12 holds the electronic circuit 24 in the recess 15.

Figure 2:
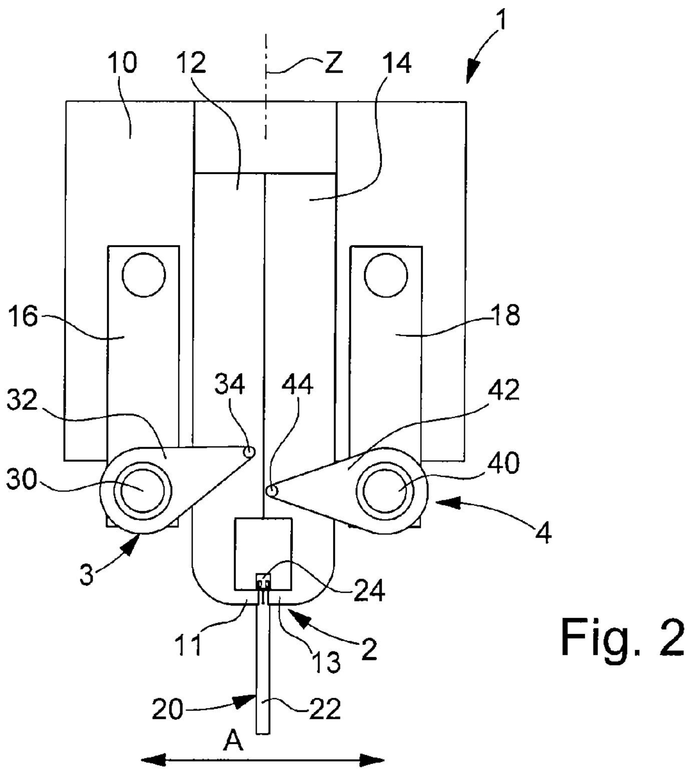
FIG. 2 is a top view of the holding tool.

The holding tool 1 further comprises a first wire guide means 3 and a second wire guide means 4 which are disposed at the holding tool body 10 remote from the jaws 12, 14. Each wire guide means 3, 4 comprises a shaft 30, 40 each rotatable about an axis X, X' wherein the axes X, X' are parallel to each other and perpendicular to the first direction A. In the example shown in the drawings the axes X, X' are vertically aligned and the shafts 30, 40 are positioned adjacent to the respective gripping portion 11, 13 of the jaws 12, 14 on the left side and on the right side of the jaws 12, 14, respectively, as can be seen in FIG. 2.

Figure 3:
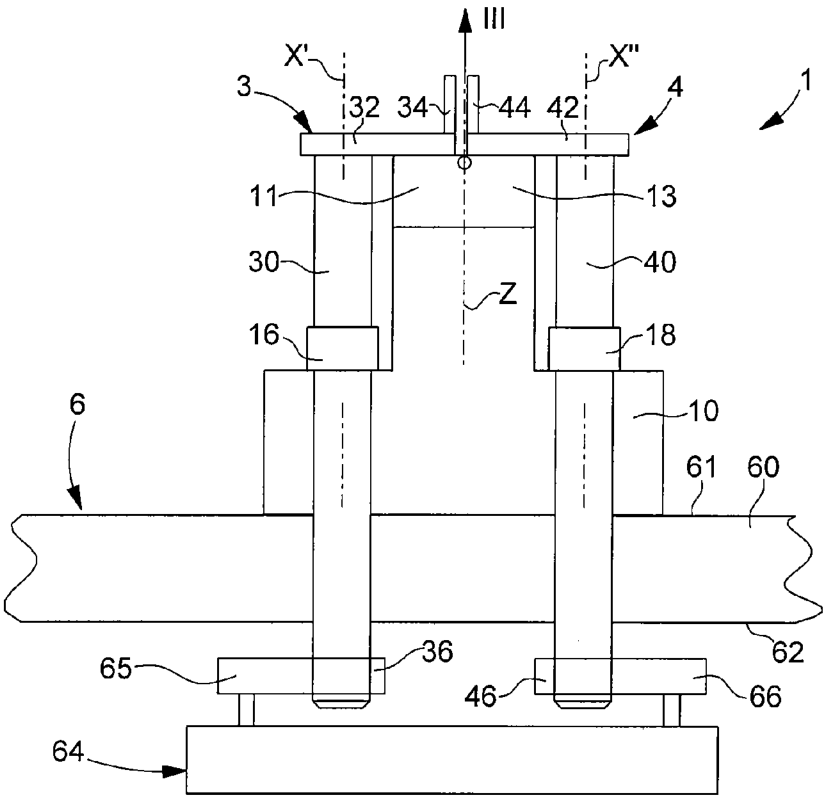
FIG. 3 is a front view of the holding tool as seen in the direction of arrow III in FIG. 2.

Each shaft 30, 40 is provided at the upper end thereof with a crank 32, 42 extending in a plane perpendicular to the respective axis X, X' above an associated one of the jaws 12, 14 as can be seen in FIG. 3.

Each crank 32, 42 carries a wire guide pin 34, 44 wherein each wire guide pin 34, 44 has an axis parallel to and spaced apart from the respective axis X, X' of the associated shaft 30, 40. In a normal position the wire guide pins 34, 44 are positioned above an adjacent one of the jaws 12, 14.

As each crank 32, 42 is rotatably fixed to the associate shaft 30, 40 a rotating movement of a shaft 30, 40 will also rotate the crank 32, 42 resulting in a movement of the associated wire guide pin 34, 44 on a circular path around the axis X, X' of the respective shaft 30, 40. This rotational movement of the shafts 30, 40 can thus be used to adjust the position of the associated wire guide pin 34, 44.

Each shaft 30, 40 is rotatably journalled in a mounting structure 16, 18 mounted to the holding tool body 10.

A wire 5 is wound around the core 22 of the winding assembly 20 and end portions 50, 52 of the wire extend between the winding assembly 20 and the first and second guide pin 34, 44, respectively, as can be seen in detail in FIG. 4.

The front view of FIG. 3 shows how the holding tool 1 is mounted to a circular table 60 of a circular table manufacturing unit 6. The circular table 60 as well as the circular table manufacturing unit 6 are only schematically shown in the drawings.

Whereas, the holding tool body 10 of the holding tool 1 is mounted on the upper surface 61 of the circular table 60, the shafts 30, 40 are positioned radially outward of the circular table 60 and extend below the lower surface 62 of the circular table 60.

A schematically shown drive means 64 which also belongs to the circular table manufacturing unit 6 is disposed below the circular table 60. Coupling means 36, 46 are provided at the lower end of each shaft 30, 40 as can be seen in FIG. 3. In the example of the description each coupling means 36, 46 is a gear wheel meshing with an associated driven pinion gear 65, 66 of drive means 64. Each one of the driven pinion gears 65, 66 can be independently driven by the drive means 64 in order to independently adjust each wire guide pin 34, 44.

Instead of or in addition to the previously described electric drive means 64 each shaft 30, 40 can alternatively also be provided with an actuator arm (not shown) so that an adjustment of the wire guide pins 34, 44 can be manually carried out by manually moving the actuator arms.

The drive means 64 may be provided only at one station of the multi-station circular table wherein different manufacturing steps are carried out in each station. The shaft 30, 40 of the holding tool 1 may be fixed by blocking means (not shown) in order to avoid that the shafts are rotated and thus the wire guide pins 34, 44 are displaced when the holding tool 1 is not in the position where the drive means 64 is provided.

The process of adjusting the position of the wire portion between the winding assembly 20 and the associated wire guide pin 34, 44 will be described hereinafter with respect to FIG. 4.

A first portion 50 of the wire 5 is positioned exactly above a first contact portion 25 of the electronic circuit 24. A second wire portion 52, however, is misaligned with respect to a second contact portion 26 of the electronic circuit 24.

A rotation of the second shaft 40 in a clockwise direction (as seen from above) will rotate the second crank 42 into the position shown in FIG. 4 in phantom lines and will thus move the second wire guide pin 44 from its first position in the clockwise direction to the second position 44'. As the new position 44' of the wire guide pin 44 is laterally more spaced apart from the plane of symmetry Z of the jaws 12, 14 the wire portion 52 between the winding assembly 20 and the second wire guide pin will move to the right, shown as the dashed line 52' in FIG. 4, and will thus be positioned exactly over the second contact portion 26 of the electronic circuit 24.

This adjusting process is part of a method of manufacturing an electronic component, which is usually carried out on a multi-station circular table 6 wherein the circular table is provided with six stations. In the first station the electronic circuit 24 is provided on the holding tool 1 and placed in the recess 15. In the second station the core 22 is fed to the holding tool 1 and fixed between the gripping portions 11, 13. In the third station the wire 5 is wound on the core 22 in order to produce the winding assembly 20. In the fourth station the position of the respective wire portion 50, 52 over the associated contact portion 25, 26 of the electronic circuit 24 is checked and if the wire portion is misaligned the above described adjusting step is carried out. Then, the wire portions 50, 52 are each bonded to their associated contact portion 25, 26. In the fifth step the wire 5 is fixed on the winding assembly 20, e.g. by blowing heated air on the winding assembly whereupon the outer insulation of adjacent windings of the wire adheres together. In a sixth step the electronic component 2 is removed from the holding tool 1.

The invention is not restricted to the above-described exemplary embodiment, which only serves for a general explanation of the core concept of the invention. Rather more, it is within the scope of protection that the holding tool and the circular table manufacturing unit in accordance with the invention could also adopt different forms than those of the embodiments described above. In particular thereby, the holding tool and the circular table manufacturing unit may comprise features that represent a combination of the respective individual features of the claims.

The reference symbols in the claims, the description and the drawings serve only to provide a better understanding of the invention and are not intended to limit the scope of protection.

What is claimed is:

1. A holding tool for fixing an electronic component during a manufacturing process, said electronic component comprising a winding assembly and an electronic circuit, wherein the holding tool comprises:

(a) a holding tool body;

(b) first and second jaws disposed at the holding tool body relatively movable to each other in a first direction; and (c) first and second wire guide means that are disposed at the holding tool body remote from the jaws, wherein at least one of said first and second wire guide means is movably disposed at the holding tool body, wherein at least the one of said first and second wire guide means is movable in a plane parallel to the first direction, wherein said first and second wire guide means each comprise a wire guide pin mounted to a crank provided on a shaft rotatable about a first axis that is remote from a second axis of the wire guide pin.

2. The holding tool according to claim 1, wherein each crank is provided at an upper end of the respective shaft and positioned above an associated one of the jaws.

3. The holding tool according to claim 2, wherein each shaft extends below a lower surface of the holding tool body.

4. The holding tool according to claim 1, wherein each shaft is provided with an actuator arm.

5. A holding tool for fixing an electronic component during a manufacturing process, said electronic component comprising a winding assembly and an electronic circuit, wherein the holding tool comprises:

(a) a holding tool body;

(b) first and second jaws disposed at the holding tool body relatively movable to each other in a first direction; and (c) first and second wire guide means that are disposed at the holding tool body remote from the jaws, wherein the jaws and the wire guide means are configured as different parts of the holding tool, wherein at least one of said first and second wire guide means is movably disposed at the holding tool body, wherein at least the one of said first and second wire guide means is movable in a plane parallel to the first direction, and wherein said first and second wire guide means each comprise a wire guide pin mounted to a crank provided on a shaft rotatable about a first axis that is remote from a second axis of the wire guide pin.

6. The holding tool according to claim 5, wherein each crank is provided at an upper end of the respective shaft and positioned above an associated one of the jaws.

7. The holding tool according to claim 6, wherein each shaft extends below a lower surface of the holding tool body.

8. The holding tool according to claim 5, wherein each shaft is provided with an actuator arm.

* * * * *